(12) United States Patent
Inoue

(10) Patent No.: US 8,627,646 B2
(45) Date of Patent: Jan. 14, 2014

(54) CATALYST DETERIORATION DIAGNOSTIC DEVICE FOR INTERNAL COMBUSTION ENGINE

(75) Inventor: Masahiro Inoue, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 391 days.

(21) Appl. No.: 12/999,880

(22) PCT Filed: Feb. 15, 2010

(86) PCT No.: PCT/JP2010/052225
§ 371 (c)(1),
(2), (4) Date: Dec. 17, 2010

(87) PCT Pub. No.: WO2011/099164
PCT Pub. Date: Aug. 18, 2011

(65) Prior Publication Data
US 2011/0232269 A1 Sep. 29, 2011

(51) Int. Cl.
*F01N 3/00* (2006.01)
(52) U.S. Cl.
USPC ............... 60/277; 60/276; 60/278; 60/285; 60/286
(58) Field of Classification Search
USPC ............... 60/278, 276, 277, 285, 286
See application file for complete search history.

(56) References Cited

U.S. PATENT DOCUMENTS

| 7,059,120 B2 * | 6/2006 | Nakagawa et al. ............ 60/289 |
| 7,360,523 B2 * | 4/2008 | Sloane et al. ................ 123/305 |
| 7,412,820 B2 * | 8/2008 | Iida et al. ........................ 60/274 |
| 7,474,956 B2 * | 1/2009 | Nakagawa et al. ........... 701/109 |

FOREIGN PATENT DOCUMENTS

| JP | 10-318023 A | 12/1998 |
| JP | 2003-214261 A | 7/2003 |
| JP | 2005-256666 A | 9/2005 |
| JP | 2006-112251 A | 4/2006 |
| JP | 2007-023888 A | 2/2007 |
| JP | 2009-150367 A | 7/2009 |
| JP | 2009-264203 A | 11/2009 |
| WO | WO2008/107779 A2 * | 3/2008 |

* cited by examiner

*Primary Examiner* — Binh Q Tran
(74) *Attorney, Agent, or Firm* — Kenyon & Kenyon LLP

(57) ABSTRACT

A catalyst deterioration diagnostic device for a multiple-cylinder internal combustion engine including a first cylinder group having exhaust system that is equipped with an exhaust gas recirculation (EGR) device with an EGR catalyst and a second cylinder group having exhaust system that is not equipped with the EGR device. The catalyst deterioration diagnostic device implements active air-fuel ratio control to diagnose deterioration of a main catalyst. During the active air-fuel ratio control, the catalyst deterioration diagnostic device oscillates only a target air-fuel ratio of the second cylinder group, without oscillating a target air-fuel ratio of the first cylinder group, in a case where the EGR device is stopped.

4 Claims, 6 Drawing Sheets

CATALYST DETERIORATION DIAGNOSTIC DEVICE FOR INTERNAL COMBUSTION ENGINE

This is a 371 national phase application of PCT/JP2010/052225 filed 15 Feb. 2010, the content of which is incorporated herein by reference.

TECHNICAL FIELD

The present invention relates to a device for diagnosing deterioration of a catalyst disposed in an exhaust pipe of an internal combustion engine.

BACKGROUND ART

An internal combustion engine for an automobile includes a catalyst as means for purifying an exhaust gas. Especially in an internal combustion engine (for example, a gasoline engine) which performs a stoichiometric operation, a catalyst having an oxygen occlusion function, for example, a three-way catalyst is used. As the method for diagnosing a deterioration state of a catalyst having such an oxygen occlusion function, a so-called Cmax method is known. A Cmax method is a method which measures the oxygen occlusion capacity (Cmax) of a catalyst and diagnoses the deterioration of the catalyst from the measurement result.

In a Cmax method, an active air-fuel ratio control is performed, which oscillates a target air-fuel ratio with stoichiometry as a center, and thereby, forcefully changes an air-fuel ratio of the exhaust gas flowing into a catalyst between a lean side and a rich side. FIG. 4 shows a change with time of an actual air-fuel ratio (actual A/F) upstream of the catalyst and a change with time of an output value of a sub $O_2$ sensor disposed downstream of the catalyst in combination when the target air-fuel ratio is changed between 14.1 and 15.1 by active air-fuel ratio control. In the Cmax method, integration of the oxygen occlusion amount or oxygen desorption amount of the catalyst calculated by the following expression is performed, until the output value of the sub $O_2$ sensor downstream of the catalyst changes to exceed a threshold value (0.5 V), after the air-fuel ratio upstream of the catalyst changes with implementation of active air-fuel ratio control.

Oxygen occlusion amount or desorption amount=coefficient×(present air-fuel ratio−stoichiometry)×fuel amount injection amount The result of calculating the oxygen occlusion amount and the oxygen desorption amount a plurality of times respectively by the aforementioned method and taking the average of them is set as a Cmax. FIG. 4 shows a change with time of the oxygen occlusion amount with respect to the Cmax with the time base thereof matched with the other graphs.

Incidentally, as the structure of the exhaust system of an internal combustion engine, there is known the structure in which a plurality of cylinders are grouped into two cylinder groups, an exhaust system is provided for each of the cylinder groups, and the two exhaust systems are collected into one exhaust collecting pipe, as shown in, for example, Japanese Patent Laid-Open No. 2006-112251. Further, in the structure of such an exhaust system, there is known the structure in which a catalyst is disposed in the exhaust collecting pipe so that the exhaust gas exhausted from each of the cylinders is collectively treated with the catalyst of the exhaust collecting pipe. Further, in such a structure of the exhaust systems, there is known the structure in which an EGR device is provided in one of the exhaust systems, and the EGR gas taken out of the exhaust system is recirculated into the intake system of each of the cylinders.

What becomes a problem here is the case of the EGR device provided with a catalyst. Hereinafter, the catalyst disposed in the exhaust collecting pipe will be called a main catalyst, and the catalyst provided in the EGR device will be called an EGR catalyst, in the structure of the exhaust systems described above. The main catalyst is in charge of purifying the exhaust gas which is exhausted from each of the cylinders, and the main catalyst is also the target of deterioration diagnosis by the Cmax method. As the environment in which the deterioration diagnosis of the main catalyst is performed, both the situation in which the EGR device is stopped and the situation in which the EGR device is operating are conceivable, but the presence of the EGR catalyst has an influence on the diagnosis result, in more detail, the calculation result of the Cmax in the situation where the EGR device is stopped.

When the EGR device is stopped, more specifically, when the EGR valve is totally closed, the EGR gas is not recirculated into the intake system from the exhaust system. However, even if the EGR valve is totally closed, inflow and outflow of the exhaust gas occur between the exhaust system and the EGR pipe with the variation of the exhaust pressure, and thereby, inflow and outflow of the exhaust gas to and from the EGR catalyst occur. FIG. 5 shows the result of investigating how the turbine inflow gas amount (total exhaust gas amount) and the EGR catalyst gas amount (gas amount flowing to and from the EGR catalyst) when the EGR valve is totally closed change in accordance with the crank angle. The drawing shows that the inflow and outflow of the exhaust gas to and from the EGR catalyst is the phenomena which constantly occur when the EGR valve is totally closed.

Accordingly, the flow of the exhaust gas when the EGR valve is totally closed, which is shown by the block diagram, is as in FIG. 6. α in the drawing represents a ratio of gas breathing into the EGR pipe, that is, the ratio of the exhaust gas which flows in and from the exhaust system and the EGR pipe. Of all the exhaust gases, the gas which directly flows into the main catalyst (S/C catalyst in the drawing) is an exhaust gas of 1-α, and the exhaust gas of a temporarily enters the EGR catalyst from the exhaust system, and thereafter, flows out to the exhaust system again to flow into the main catalyst. The exhaust gas which enters the EGR catalyst is purified close to stoichiometry in accordance with the oxygen occlusion amount of the EGR catalyst. Therefore, the purified exhaust gas of a and the unpurified exhaust gas of 1-α are mixed and flow into the main catalyst.

Meanwhile, FIG. 7 shows the flow of the exhaust gas when the EGR device is operating and the EGR is performed. In this case, when the EGR rate is set as β, the exhaust gas of 1-β out of all the exhaust gases flows into the main catalyst. The remaining exhaust gas of β flows into the EGR catalyst, and is recirculated into the intake system after passing through the EGR catalyst. Accordingly, in this case, the exhaust gas which is purified by the EGR catalyst is not mixed into the exhaust gas which flows into the main catalyst.

Of the two cases shown in FIGS. 6 and 7, a problem occurs in diagnosis of deterioration of the main catalyst in the case shown in FIG. 6. In the case shown in FIG. 7, the air-fuel ratio of the exhaust gas which flows into the main catalyst is not influenced by the EGR catalyst, and therefore, the air-fuel ratio of the exhaust gas which flows into the main catalyst can be controlled as intended by the active air-fuel ratio control. However, in the case shown in FIG. 6, the EGR catalyst functions as a low-pass filter when the target air-fuel ratio is oscillated at a high frequency by the active air-fuel ratio control. Therefore, it is difficult to control the air-fuel ratio of the exhaust gas which flows into the main catalyst as intended.

FIG. 8 shows the change of the target air-fuel ratio (target A/F), the change with time of the actual air-fuel ratio (actual A/F) upstream of the main catalyst, and the change with time of the output value of the sub $O_2$ sensor disposed downstream of the main catalyst when the active air-fuel ratio control is performed in the case shown in FIG. 6, together with the change with time of the virtual actual A/F when the EGR catalyst is assumed to be absent. Further, FIG. 8 shows the change with time of the oxygen occlusion amount with respect to Cmax for the main catalyst and the EGR catalyst with the time axis matched with the other graphs. From this drawing, it can be read that the value of the actual A/F upstream of the main catalyst changes in accordance with the oxygen occlusion amount of the EGR catalyst. Further, the EGR catalyst is generally enhanced in oxidization reaction for its function, and therefore, a lean gas is purified faster as compared with a rich gas. Therefore, the time constants at the time of reversal of rich and lean of the air-fuel ratio of the exhaust gas which flows into the catalyst differ, and the time variation easily occurs in the desorption and occlusion of oxygen. Accordingly, it is found out that in the case shown in FIG. 6, the variations of the respective integration values of the oxygen occlusion amount and the oxygen desorption amount are large, and ensuring the estimation accuracy of the Cmax is difficult.

Further, when the air-fuel ratio of the exhaust gas which flows into the EGR catalyst changes in oscillation, the oxidization reaction on the catalyst is promoted. EGR is generally taken out from the place where the exhaust gas temperature is high (for example, upstream of the turbine), and therefore, depending on the degree of the oxidization reaction, the temperature of the EGR catalyst is likely to exceed the upper limit temperature. Therefore, the amplitude and the frequency in the active air-fuel ratio control are limited from the viewpoint of the upper limit temperature of the EGR catalyst, and due to the limitation, the deterioration diagnosis sometimes cannot be reliably performed.

SUMMARY OF INVENTION

The present invention is made to solve the problems as described above, and has an object to obtain an oxygen occlusion capacity of a catalyst disposed in an exhaust collecting pipe with high precision, and to be able to diagnose deterioration of the catalyst based on the result, in an internal combustion engine including an EGR device with an EGR catalyst in some of exhaust systems.

For this purpose, the present invention provides a catalyst deterioration diagnostic device for an internal combustion engine as follows.

An internal combustion engine to which a catalyst deterioration diagnostic device of the present invention is applied is a multiple-cylinder internal combustion engine including a plurality of cylinders. In the internal combustion engine, a plurality of cylinders are grouped into at least two cylinder groups, and an exhaust system is provided at each of the cylinder groups. The exhaust systems of the respective cylinder groups are collected into one exhaust collecting pipe. A main catalyst having an oxygen occlusion function is disposed in the aforesaid exhaust collecting pipe, and air-fuel ratio sensors are attached respectively at an upstream side and a downstream side of the main catalyst. Further, the internal combustion engine includes an EGR device with an EGR catalyst in some of the exhaust systems.

The catalyst deterioration diagnostic device of the present invention implements active air-fuel ratio control which forcefully changes an air-fuel ratio of an exhaust gas which flows into the main catalyst between a lean side and a rich side with stoichiometry as a center. The catalyst deterioration diagnostic device measures an oxygen occlusion capacity of the main catalyst by using signals outputted from the air-fuel ratio sensor and oxygen sensor at a time of implementation of the active air-fuel ratio control, and diagnoses deterioration of the main catalyst from a measurement result of the oxygen occlusion capacity.

One feature of the catalyst deterioration diagnostic device of the present invention is a concrete operation in the active air-fuel ratio control. In the active air-fuel ratio control according to the catalyst deterioration diagnostic device of the present invention, when the EGR device is stopped, a target air-fuel ratio of the cylinder group with the EGR device not provided in the exhaust system is changed between the lean side and the rich side with stoichiometry as a center. As a result that such an operation is performed, the influence which the EGR catalyst gives to the air-fuel ratio of the exhaust gas which flows into the main catalyst can be made small.

In a more preferable mode, in the active air-fuel ratio control, when the EGR device is stopped, a target air-fuel ratio of the cylinder group with the EGR device provided in the exhaust system is kept stoichiometric. As a result that such an operation is performed, the influence which the EGR catalyst gives to the air-fuel ratio of the exhaust gas which flows into the main catalyst can be made smaller.

In another more preferable mode, in the active air-fuel ratio control, when the EGR device is stopped, the target air-fuel ratio of the cylinder group with the EGR device not provided in the exhaust system is changed with an amplitude larger than that of the active air-fuel ratio control which is performed when the EGR device is operating. As a result that such an operation is performed, the influence which the EGR catalyst gives to the air-fuel ratio of the exhaust gas which flows into the main catalyst can be made smaller.

DESCRIPTION OF EMBODIMENTS

Hereinafter, an embodiment of the present invention will be described with reference to each of FIGS. 1 to 3.

Figure 1:
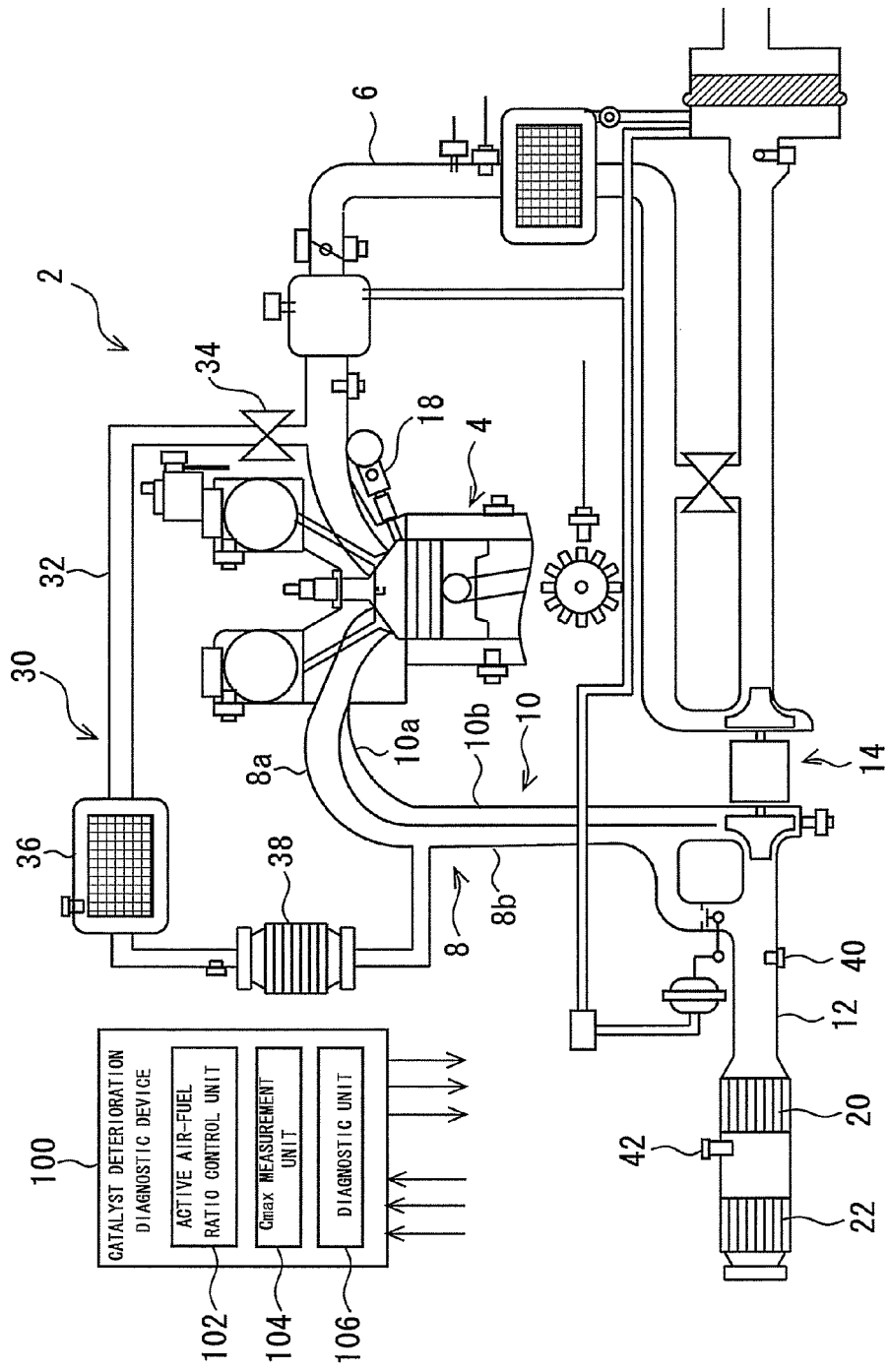
FIG. 1 is a system diagram of an internal combustion engine to which a catalyst deterioration diagnostic device of the present invention is applied.

FIG. 1 is a diagram showing a system configuration of an internal combustion engine to which a catalyst deterioration diagnostic device of the embodiment of the present invention is applied. An internal combustion engine 2 according to the present embodiment is a spark ignition four-stroke reciprocating engine (hereinafter, simply called an engine). Further, the engine 2 of the present embodiment is also an in-line four-cylinder engine which includes four cylinders 4 in line, though FIG. 1 shows only one cylinder 4. Further, the engine 2 of the present embodiment is also a direct injection engine which directly injects a fuel into a cylinder by a cylinder injector 18, and is also a turbo engine including a turbo supercharger 14 which compresses fresh air by using the energy of an exhaust gas.

In the present embodiment, the four cylinders 4 which the engine 2 has are grouped into two cylinder groups each with two cylinders. A first cylinder and a fourth cylinder the explosions of which are not continuous are grouped as one cylinder group, and a second cylinder and a third cylinder the explosions of which are not continuous are similarly grouped as one cylinder group. The engine 2 includes exhaust systems 8 and 10 respectively at these cylinder groups. The respective exhaust systems 8 and 10 are constituted of exhaust manifolds 8a and 10a in which the exhaust gases in the two cylinders are collected, and exhaust pipes 8b and 10b which are connected to outlets of the exhaust manifolds. The exhaust pipes 8b and 10b of the respective exhaust systems 8 and 10 are connected to one exhaust collecting pipe 12 in a turbine part of the turbo supercharger 14.

In the exhaust collecting pipe 12, two three-way catalysts 20 and 22 are disposed in line. The three-way catalyst 20 at the upstream side is a main catalyst which is a diagnosis target by the catalyst deterioration diagnostic device of the present embodiment. A wide area air-fuel ratio sensor (hereinafter, an A/F sensor) 40 is attached to an upstream side of the main catalyst 20. At a downstream side of the main catalyst 20, a zirconia oxygen sensor (hereinafter, a sub $O_2$ sensor) 42 is attached. As the air-fuel ratio sensor in the present invention, not only the wide area air-fuel ratio sensor, but also a zirconia oxygen sensor can be used. Conversely, as the oxygen sensor in the present invention, not only a zirconia oxygen sensor, but also a wide area air-fuel ratio sensor can be used.

The engine 2 of the present embodiment includes an EGR device 30 which recirculates an exhaust gas into an intake pipe 6 from the exhaust system. The EGR device 30 is provided in only the exhaust system 8 out of the aforesaid two exhaust systems 8 and 10. The EGR device 30 connects the exhaust pipe 8b and the intake pipe 6 by an EGR pipe 32. The EGR pipe 32 is provided with an EGR valve 34. In the EGR pipe 32, an EGR cooler 36 is provided at an exhaust side of the EGR valve 34, and further at the exhaust side thereof, an EGR catalyst 38 is provided.

A control system of the engine 2 of the present embodiment includes an ECU 100. The ECU 100 is a control device which generally controls the entire system of the engine 2. Actuators such as the aforementioned cylinder injector 18 and the EGR valve 34 are connected to an output side of the ECU 100, and sensors such as the aforementioned A/F sensor 40 and the sub $O_2$ sensor 42 are connected to an input side of the ECU 100. The ECU 100 operates each of the actuators in accordance with a predetermined control program by receiving a signal from each of the sensors. A number of the other actuators and sensors which are connected to the ECU 100 are present as shown in the drawing, but the explanation of them will be omitted in the present description.

The catalyst deterioration diagnostic device of the present embodiment is realized as one function of the ECU 100. When the ECU 100 functions as the catalyst deterioration diagnostic device, the ECU 100 is expressed by the combination of three signal processing units, that is, an active air-fuel ratio control unit 102, a Cmax measurement unit 104 and a diagnostic unit 106. These signal processing units may be each configured by exclusive hardware, or may be virtually configured by software by sharing hardware.

The active air-fuel ratio control unit 102 implements active air-fuel ratio control which forcefully changes the air-fuel ratio of the exhaust gas which flows into the main catalyst 20 between a lean side and a rich side with stoichiometry as a center. The active air-fuel ratio control is open loop control, determines the fuel injection amount from the cylinder intake air amount and the target air-fuel ratio, and controls fuel injection time by the cylinder injector 18.

The Cmax measurement unit 104 measures the oxygen occlusion capacity of the main catalyst 20, that is, the Cmax with implementation of the active air-fuel ratio control. In more detail, during the time until the output value of the sub $O_2$ sensor 42 changes to exceed a threshold value (0.5 V) after the output value of the A/F sensor 40 changes, the Cmax measurement unit 104 calculates the oxygen occlusion amount (or oxygen desorption amount) per unit time from the deviation of the present air-fuel ratio from stoichiometry and the present fuel injection amount, and integrates the calculation results. Subsequently, the Cmax measurement unit 104 performs calculation of the integrated value a plurality of times, and calculates the average of them as the Cmax.

The diagnostic unit 106 compares the measurement value of the Cmax with a predetermined deterioration reference value. If the Cmax is larger than the deterioration reference value, it is determined that the main catalyst 20 is not deteriorated, whereas if the Cmax is the deterioration reference value or less, the main catalyst 20 is determined to be deteriorated.

One feature of the catalyst deterioration diagnostic device of the present embodiment is the content of the concrete operation in the aforesaid active air-fuel ratio control. FIG. 2 is a flowchart showing a routine of the air-fuel ratio control for deterioration determination, which is performed by the active air-fuel ratio control unit 102. The aforesaid active air-fuel ratio control is implemented in accordance with the air-fuel ratio control routine.

Figure 2:
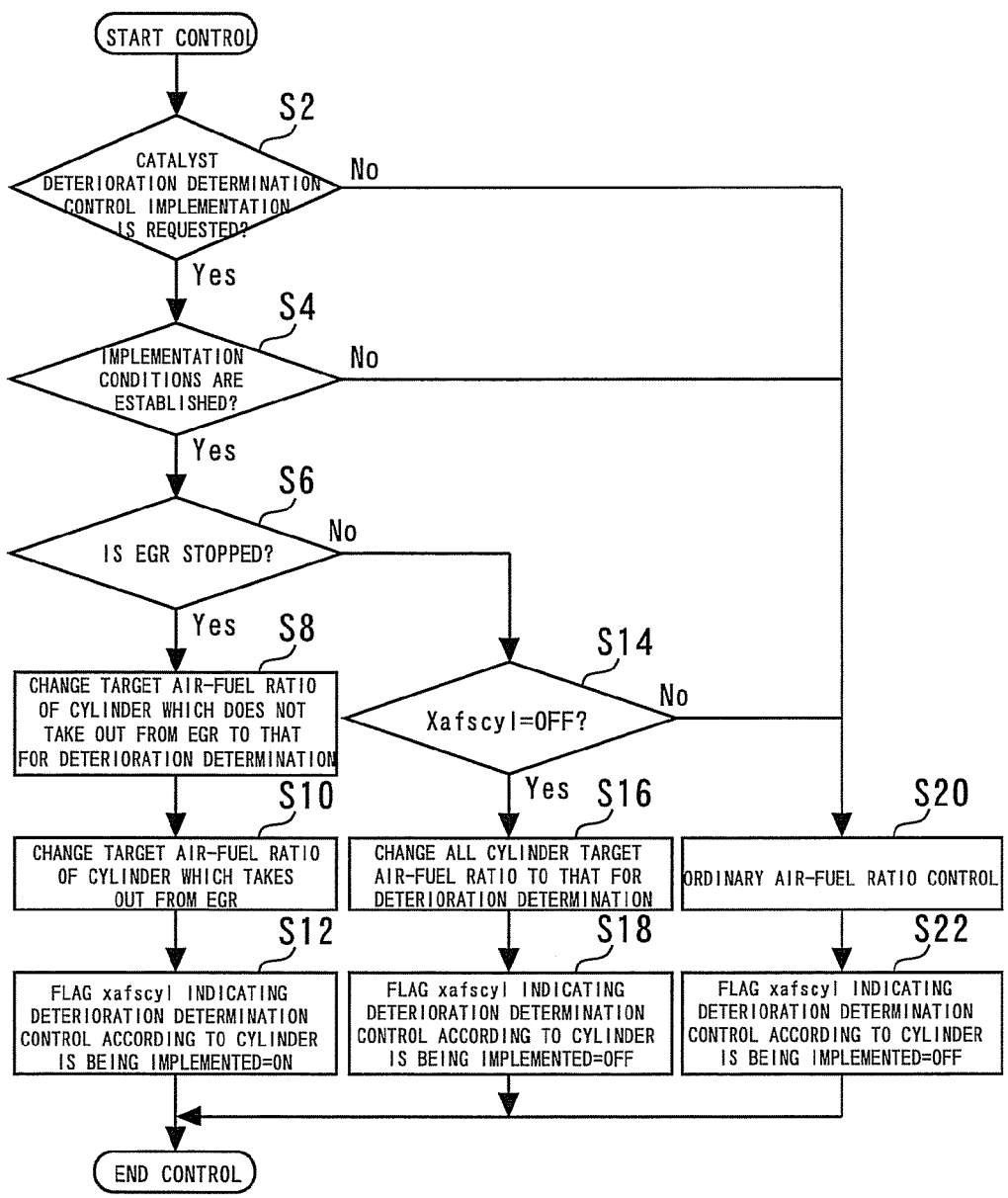
FIG. 2 is a flowchart showing a routine of air-fuel ratio control for deterioration determination which is performed in an embodiment of the present invention.

According to the flowchart of FIG. 2, in the first step S2, presence or absence of an implementation request of catalyst deterioration determination control is determined. The catalyst deterioration determination control indicates air-fuel ratio control for measurement of the Cmax, that is, active air-fuel ratio control. The aforesaid implementation request is a request which is issued in the case of the situation of diagnosing the deterioration of the main catalyst 20. In the case of absence of such a request, the flow proceeds to step S20. In step S20, ordinary air-fuel ratio control, that is, the air-fuel ratio feedback control based on the signals from the A/F sensor 40 and the sub $O_2$ sensor 42 is performed. In the next step S22, a predetermined flag xafscyl is turned off. The meaning of the flag xafscyl will be described later.

When the aforesaid implementation request is detected in step S2, determination of step S4 is performed. In step S4, whether or not the implementation conditions of the active air-fuel ratio control are established is determined from the operation state and the operation conditions of the engine 2. If the implementation conditions are not established yet, the ordinary air-fuel ratio control is continued in step S20. Subsequently, the flag xafscyl is kept off in step S22.

When the implementation conditions of the active air-fuel ratio control are established in step S4, determination of step S6 is performed next. In step S6, whether or not the EGR is stopped, that is, whether or not the EGR valve 34 is totally closed is determined. When the EGR is not stopped, the determination of step S14 is further performed. In step S14, whether or not the flag xafscyl is off is determined. The flag xafscyl is a flag which is turned on when the active air-fuel ratio control is performed in the state in which the EGR is stopped.

When the flag xafscyl is off in step S14, the processing of step S16 is performed. In step S16, the target air-fuel ratio is changed to that for deterioration determination in all the cylinders. The target air-fuel ratio for deterioration determination is set as a rectangular wave signal which oscillates with a predetermined period between the lean side and the rich side with stoichiometry as the center. The amplitudes of the oscillation of the target air-fuel ratio are the same in all the cylinders irrespective of whether or not the exhaust system is provided with the EGR device 30. Subsequently, in step S22, the flag xafscyl is kept off.

Meanwhile, when the flag xafscyl is on in step S14, the processing of step S20 is performed. After ordinary air-fuel ratio control is temporarily performed in step S20, the flag xafscyl is changed to on from off in the subsequent step S22. As a result that the flag xafscyl is changed to off, the result of the determination of step S14 of the next time becomes positive. Accordingly, in this case, the active air-fuel ratio control of step S16 is performed in the control period of the next time.

When the EGR is stopped in step S6, the active air-fuel ratio control is performed in step S8 and step 16. First, in step S8, the target air-fuel ratio of the cylinder group connected to the exhaust system 10 which is not provided with the EGR device 30 is changed to that for deterioration determination. The target air-fuel ratio which is set in this case is a rectangular wave signal which oscillates with a predetermined period between the lean side and the rich side with stoichiometry as the center, as in the case of step S16. However, the target air-fuel ratio has a larger amplitude of oscillation than the target air-fuel ratio set in step S16. This is because the exhaust gas of the exhaust system 10 is not influenced by the EGR catalyst 38, and therefore, the SN ratio of the air-fuel ratio signal of the exhaust gas which flows into the main catalyst 20 can be enhanced by making the amplitude of the air-fuel ratio large.

In step S10, the target air-fuel ratio of the cylinder group connected to the exhaust system 8 which is provided with the EGR device 30 is changed. The target air-fuel ratio which is set in this case is stoichiometry, and the target air-fuel ratio is not oscillated unlike the cases of step S16 and step S8. This is for preventing change from occurring to the air-fuel ratio before and after inflow and outflow to and from the EGR catalyst 38 by keeping the air-fuel ratio of the exhaust gas flowing into the EGR catalyst 38 stoichiometric. More specifically, this is for eliminating the influence of the EGR catalyst 38 on the air-fuel ratio. Further, this is also aimed at prevention of rise in the catalyst temperature by relieving the oxidization reaction on the catalyst by suppressing the oscillation of the air-fuel ratio of the exhaust gas which flows into the EGR catalyst 38. In the next step S12, the flag xafscyl is changed to on.

Figure 3:
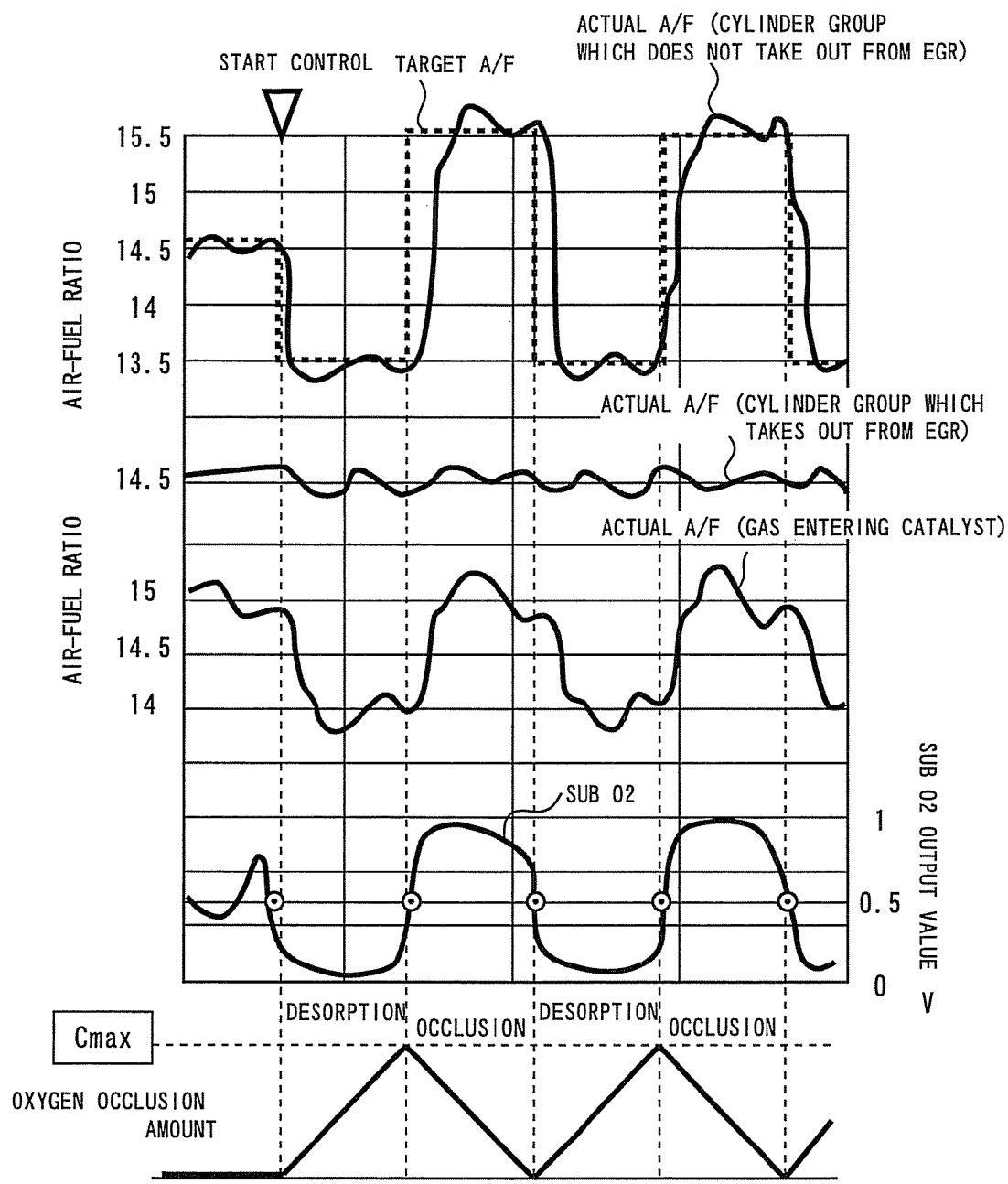
FIG. 3 is a diagram showing an implementation result of the air-fuel ratio control routine for deterioration determination shown in FIG. 2.
Figure 4:
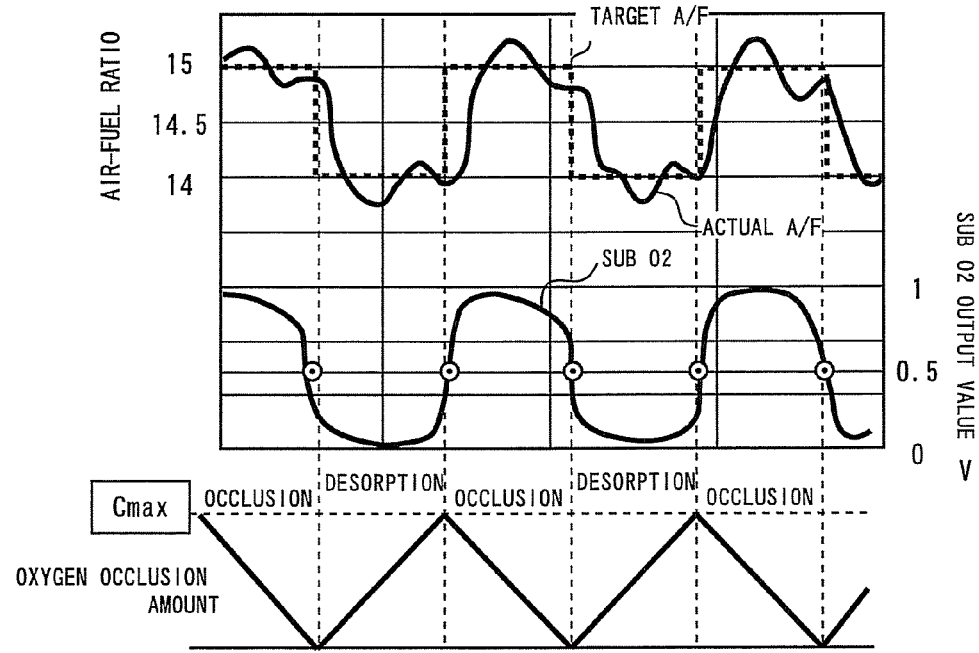
FIG. 4 is a diagram showing changes of output values of respective sensors and an oxygen occlusion amount of a catalyst when active air-fuel ratio control is implemented.
Figure 5:
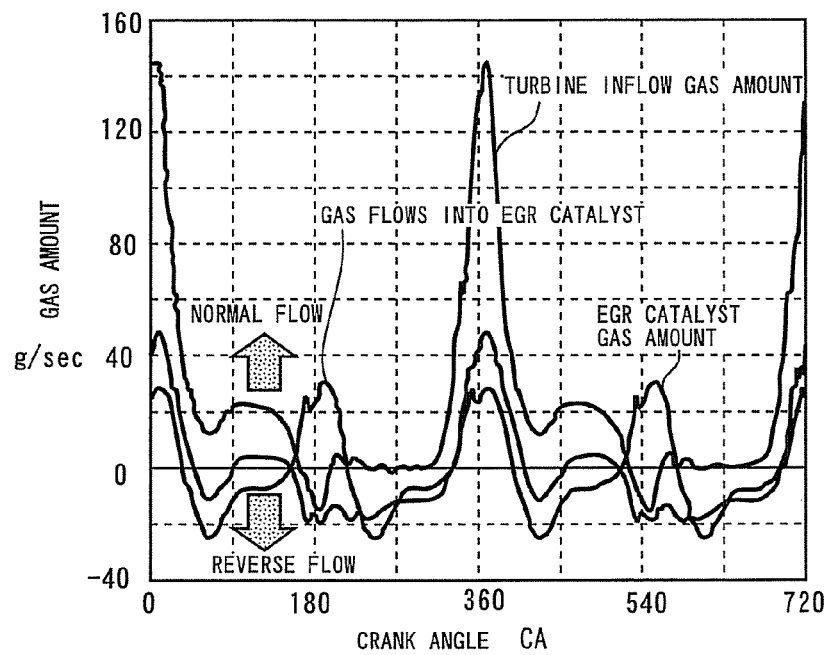
FIG. 5 is a diagram showing a change of each of gas flow rates of exhaust systems according to a crank angle when an EGR valve is totally closed.
Figure 6:
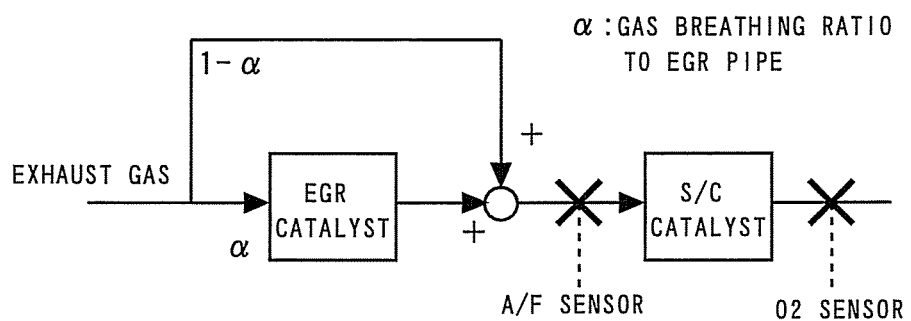
FIG. 6 is a block diagram showing a flow of an exhaust gas when the EGR valve is totally closed in the exhaust system provided with an EGR device with an EGR catalyst.
Figure 7:
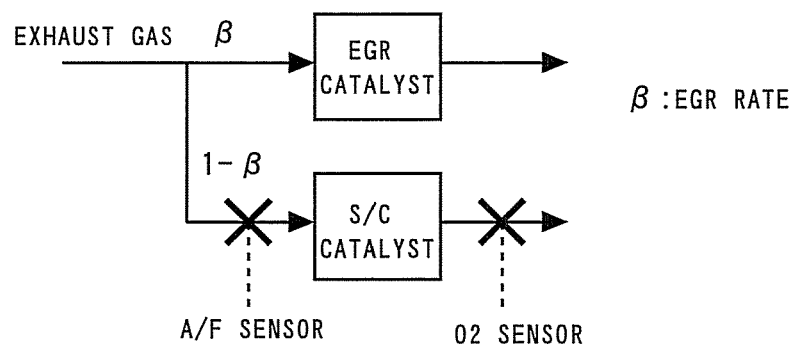
FIG. 7 is a block diagram showing the flow of the exhaust gas when the EGR device is operating and EGR is performed in the exhaust system provided with the EGR device with the EGR catalyst.

FIG. 3 shows the result of the active air-fuel ratio control which is implemented especially when the determination conditions of step S6 are established, as the result of the air-fuel ratio control described above. The uppermost section of FIG. 3 shows setting of the target air-fuel ratio (target A/F) of the cylinder group (the cylinder group without taking out from EGR) connected to the exhaust system 10 which is not provided with the EGR device 30, and the change with time of the actual air-fuel ratio (actual A/F) in the exhaust pipe 10b which is caused by this. The second section from the top shows the change with time of the actual A/F of the cylinder group (cylinder group taking out from the EGR) connected to the exhaust system 8 provided with the EGR device 30. The third section from the top shows the change with time of the actual A/F of the exhaust gas (catalyst entry gas) which flows into the main catalyst 20. The actual A/F of the exhaust gas which flows into the main catalyst 20 is the average of the actual A/F of the exhaust gas from the exhaust system 10 and the actual A/F of the exhaust gas from the exhaust system 8. The fourth section from the top shows the change with time of the output value of the sub $O_2$ sensor 42. The lowermost section shows the change with time of the oxygen occlusion amount with respect to the Cmax.

Figure 8:
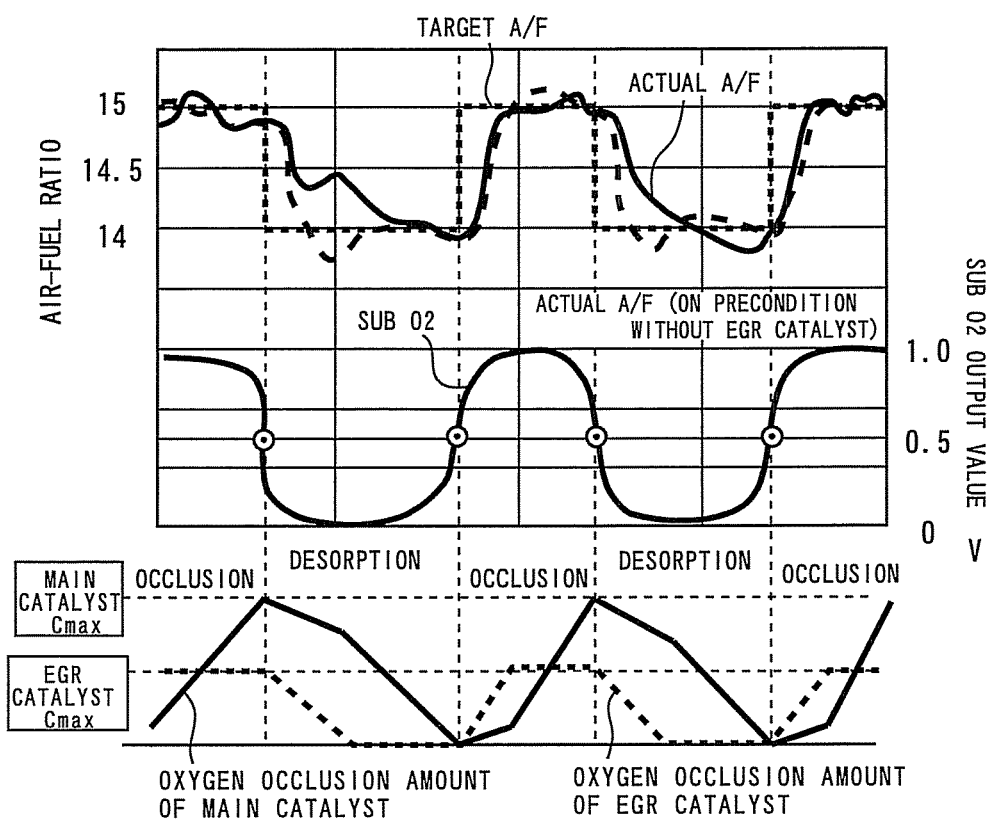
FIG. 8 is a diagram showing changes of the output values of the respective sensors and the oxygen occlusion amount of the catalyst when the active air-fuel ratio control is implemented with totally closing the EGR valve in the exhaust system provided with the EGR device with the EGR catalyst.

As is known from the chart in the third section of FIG. 8, according to the active air-fuel ratio control of steps S8 and S10, the air-fuel ratio of the exhaust gas which flows into the main catalyst 20 is prevented from being influenced by the EGR catalyst 38, and the air-fuel ratio of the exhaust gas which flow into the main catalyst 20 can be controlled as intended. Therefore, difference does not occur to the time constant at the time of reversal of rich and lean of the air-fuel ratio of the exhaust gas which flows into the main catalyst 20, and temporal variation of desorption and occlusion of oxygen does not occur. Consequently, according to the catalyst deterioration diagnostic device of the present embodiment, the estimation precision of the Cmax can be ensured, and deterioration of the main catalyst 20 can be accurately diagnosed based on the Cmax obtained with high precision.

The embodiment of the present invention is described above, but the present invention is not limited to the aforementioned embodiment, and can be carried out by being variously modified in the range without departing from the gist of the present invention. For example, the engine 2 of the aforementioned embodiment is an in-line engine, but the present invention is applicable to a V-type engine. In a V-type engine, the respective cylinders on the left and right banks can be regarded as cylinder groups. In this case, an EGR device with EGR can be provided at any one of the exhaust system on the left bank and the exhaust system on the right bank.

Further, the engine 2 of the aforementioned embodiment is a direct injection turbo engine, but it is not an essential matter in application of the catalyst deterioration diagnostic device of the present invention that the engine 2 be a direct injection engine or a turbo engine.

Further, when the deterioration diagnosis is performed in the situation in which the EGR valve 34 is totally closed, the oxygen occlusion amount of the EGR catalyst 38 is more preferably set to be lean prior to implementation of active air-fuel ratio control. As the method thereof, for example, a lean operation is performed while EGR is performed by operating the EGR device. This is because by doing so, the purification rate of the EGR catalyst 38 can be prevented from significantly changing during implementation of the active air-fuel ratio control.

Description of Reference Numerals

2 Engine

4 Cylinder

6 Intake pipe
8, 10 Exhaust system
8a, 10a Exhaust manifold
8b, 10b Exhaust pipe
12 Exhaust collecting pipe
20 Main catalyst (three-way catalyst)
30 EGR device
32 EGR pipe
34 EGR valve
38 EGR catalyst
40 A/F sensor
42 Sub $O_2$ sensor
100 ECU

The invention claimed is:

1. A catalyst deterioration diagnostic device for a multiple-cylinder internal combustion engine including
a first cylinder group provided with a first exhaust system, the first exhaust system being equipped with an EGR device with an EGR catalyst,
a second cylinder group provided with a second exhaust system, the second exhaust system being not equipped with the EGR device,
an exhaust collecting pipe which is formed by collecting the exhaust systems of the respective cylinder groups into one,
a main catalyst which is disposed in the exhaust collecting pipe and has an oxygen occlusion function,
an air-fuel ratio sensor attached at an upstream side of the main catalyst in the exhaust collecting pipe, and
an oxygen sensor attached at a downstream side of the main catalyst in the exhaust collecting pipe,
the catalyst deterioration diagnostic device, comprising:
an active air-fuel ratio control unit that implements active air-fuel ratio control which forcefully oscillates an air-fuel ratio of an exhaust gas which flows into the main catalyst between a lean side and a rich side with stoichiometry as a center;
a measurement unit that measures an oxygen occlusion capacity of the main catalyst by using signals outputted from the air-fuel ratio sensor and oxygen sensor at a time of implementation of the active air-fuel ratio control; and
a diagnostic unit that diagnoses deterioration of the main catalyst from a measurement result of the oxygen occlusion capacity,
wherein the active air-fuel ratio control unit is configured to oscillate only a target air-fuel ratio of the cylinder group between the lean side and the rich side with stoichiometry as a center, without oscillating a target air-fuel ratio of the first cylinder group, in a case where the EGR device is stopped.

2. The catalyst deterioration diagnostic device for a multiple-cylinder internal combustion engine according to claim 1,
wherein the active air-fuel ratio control unit is configured to keep the target air-fuel ratio of the first cylinder group to be stoichiometric, in the case where the EGR device is stopped.

3. The catalyst deterioration diagnostic device for a multiple-cylinder internal combustion engine according to claim 1,
wherein the active air-fuel ratio control unit is configured to oscillate the target air-fuel ratio of the second cylinder group with an amplitude larger than that of active air-fuel ratio control which is performed in a case where the EGR device is operating, in the case where the EGR device is stopped.

4. The catalyst deterioration diagnostic device for a multiple-cylinder internal combustion engine according to claim 2,
wherein the active air-fuel ratio control unit is configured to oscillate the target air-fuel ratio of the second cylinder group with an amplitude larger than that of active air-fuel ratio control which is performed in a case where the EGR device is operating, in the case where the EGR device is stopped.

* * * * *